US008662469B2

United States Patent
Ejiri

(10) Patent No.: US 8,662,469 B2
(45) Date of Patent: Mar. 4, 2014

(54) POWER ASSISTED ON/OFF VALVE

(75) Inventor: Takashi Ejiri, Tokyo (JP)

(73) Assignee: Fujikura Rubber Ltd., Tokyo (JP)

( * ) Notice: Subject to any disclaimer, the term of this patent is extended or adjusted under 35 U.S.C. 154(b) by 408 days.

(21) Appl. No.: 12/993,381

(22) PCT Filed: Feb. 16, 2009

(86) PCT No.: PCT/JP2009/052526
§ 371 (c)(1),
(2), (4) Date: Nov. 18, 2010

(87) PCT Pub. No.: WO2009/142034
PCT Pub. Date: Nov. 26, 2009

(65) Prior Publication Data
US 2011/0062365 A1    Mar. 17, 2011

(30) Foreign Application Priority Data
May 23, 2008    (JP) ................................. 2008-135107

(51) Int. Cl.
*F16K 31/12*    (2006.01)
(52) U.S. Cl.
USPC ............................................................ 251/58
(58) Field of Classification Search
USPC ............................................................ 251/58
See application file for complete search history.

(56) References Cited

U.S. PATENT DOCUMENTS

| 4,549,719 A | 10/1985 | Baumann |
| 5,108,069 A | 4/1992 | Tada et al. |
| 5,556,072 A | 9/1996 | Itoi et al. |
| 6,059,259 A * | 5/2000 | Gregoire et al. ................ 251/58 |
| 2004/0107995 A1 | 6/2004 | Ejiri |

FOREIGN PATENT DOCUMENTS

| JP | 60-168977 | 9/1985 |
| JP | 1-102572 | 7/1989 |
| JP | 5-44864 | 2/1993 |
| JP | 7-139648 | 5/1995 |
| JP | 2004-183791 | 7/2004 |
| WO | 2006/093036 A1 | 9/2006 |

OTHER PUBLICATIONS

International Search Report for PCT/JP2009/052526 dated Mar. 10, 2009.

* cited by examiner

*Primary Examiner* — John K Fristoe, Jr.
*Assistant Examiner* — Kevin Barss
(74) *Attorney, Agent, or Firm* — McCormick, Paulding & Huber LLP

(57) ABSTRACT

A power-assisted mechanism having a simple structure which can perform a power-assisted operation can be achieved in a power-assisted on/off valve including a valve stem which opens and closes a flow passage, an operational member which is positioned on an axis of the valve stem and is relatively movable with respect to the valve stem, and a power-assisted mechanism which reduces the speed and power-assists the movement of the operational member, and transfers the movement of the operational member to the stem valve.
The power-assisted mechanism is provided with a transmission rod which is positioned on an axis of the operational member, the transmission rod provided with a reduced-diameter portion that reduces the diameter thereof in a direction toward the valve stem; a pressing member which is interconnected with the valve stem; a pair of motion-transmission surfaces that are formed so as to face the pressing member and a housing that movably supports the pressing member, wherein a space between the pair of motion-transmission surfaces increasingly narrows toward the outer periphery thereof; and a plurality of radial-direction movable bodies that are interposed between the pair of motion-transmission surfaces and the reduced-diameter portion of the transmission rod and are in contact therewith.

6 Claims, 4 Drawing Sheets

Fig. 3
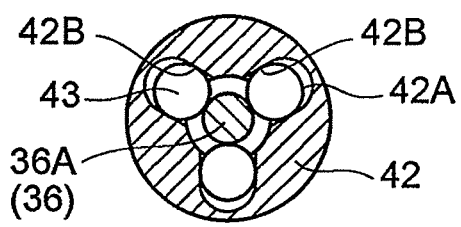
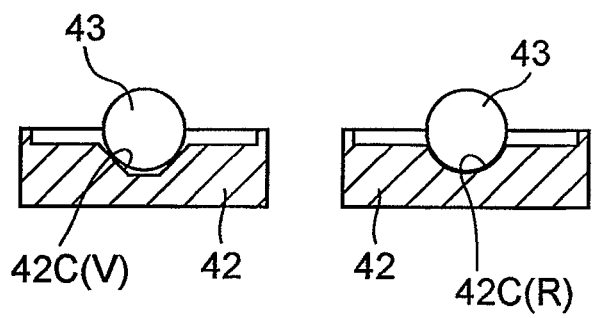
Fig. 4 (A)   Fig. 4 (B)

POWER ASSISTED ON/OFF VALVE

CROSS REFERENCE TO RELATED APPLICATIONS

This application claims the priority of Japanese patent application No. 2008-135107, filed on May 23, 2008 and PCT Application No. PCT/JP2009/052526, filed on Feb. 16, 2009, the disclosures of which are incorporated herein by reference in their entirety.

TECHNICAL FIELD

The present invention relates to a power-assisted on/off valve (high pressure valve) which power-assists and conveys an operational force to a valve stem that operates a valve body.

BACKGROUND ART

Various kinds of such power-assisted on/off valves are known in the art, and have been made practically viable. However, such power-assisted on/off valves were large, required extremely high-precision machining of the parts thereof, and it was difficult to obtain a stable performance in use over a long period of time.
Japanese Patent No. 3,392,301 discloses one embodiment of a power assisted on/off valve in the prior art.

SUMMARY OF INVENTION

Technical Problem

The inventor of the present invention has already proposed and patented in Japanese Patent No. 3,392,301 a power-assisted on/off valve having a simple structure and which can perform a power-assisted operation.

The objective of the present invention is to achieve a power-assisted on/off valve having a simpler structure and which can perform a larger power-assisted operation than that of the power-assisted on/off valve of Japanese Patent No. 3,392,301.

Solution to Problem

The present invention is characterized by a power-assisted on/off valve including a valve stem which opens and closes a flow passage; an operational member which is positioned on an axis of the valve stem and is relatively movable with respect to the valve stem; and a power-assisted mechanism which is interposed between the valve stem and the operational member, reduces the speed and power-assists the movement of the operational member, and transfers the movement of the operational member to the stem valve. The power-assisted mechanism is provided with a transmission rod which is positioned on an axis of the operational member, the transmission rod provided with a reduced-diameter portion that reduces the diameter thereof in a direction toward the valve stem; a pressing member which is interconnected with the valve stem; a pair of motion-transmission surfaces that are formed so as to face the pressing member and a housing that movably supports the pressing member, wherein a space between the pair of motion-transmission surfaces increasingly narrows toward the outer periphery thereof; and a plurality of radial-direction movable bodies that are interposed between the pair of motion-transmission surfaces and the reduced-diameter portion of the transmission rod and are in contact therewith.

It is possible to configure the pair of motion-transmission surfaces, the reduced-diameter portion of the transmission rod, and the plurality of radial-direction movable bodies so as to satisfy: 2<D/d<50, wherein D designates an amount of movement of the operational member in the axial direction thereof, and d designates an amount of movement of the valve stem in the axial direction thereof.

In a desirable embodiment, the operational member includes a piston body that is slidably fitted in the housing, wherein the piston body can move in a valve-closing direction by a spring pressure force so as to approach the valve stem, and the piston body can move in a valve-opening direction by air pressure so as to move away from the stem valve.

The motion-transmission surface on the housing can, e.g., include a surface that is orthogonal to the axis of the pressing member, wherein the motion-transmission surface on the pressing member is a conical surface.

Furthermore, by configuring the motion-transmission surface on the housing so as to include base surfaces of three radial grooves that are formed in radial directions in the housing, wherein the radial-direction movable bodies are fitted in the radial grooves, it is possible to configure a power-assisted mechanism using movable bodies that moves a small distance in the radial direction.

By configuring the motion-transmission surface on the pressing member so as to include a hard ring body that is a separate member from the pressing member, it is possible to improve durability, and it becomes possible to exchange the hard body.

It is practical to use steel balls as the radial-direction movable bodies.

As an alternative to a conical surface, it is possible for the reduced-diameter portion of the transmission rod to include part of a spherical surface or an aspherical surface.

Advantageous Effects of Invention

According to the power-assisted on/off valve of the present invention, the power-assisted mechanism is configured from a reduced-diameter portion formed on a transmission rod that is integral with an operational member, motion-transmission surfaces which face a pressing member and a housing, and a movable body that is movable in the radial direction via contact between the reduced-diameter portion and the motion-transmission surface. Accordingly, a power-assisted mechanism having a simple structure at an overall reduced cost, having a high reliability and high durability can be achieved.

BRIEF DESCRIPTION OF DRAWINGS

FIG. 3 is a cross sectional view taken along the line shown in FIG. 1

FIG. 4 is a cross sectional view taken along the line IV-IV shown in FIG. 1.

DESCRIPTION OF THE PREFERRED EMBODIMENTS

Figure 1:
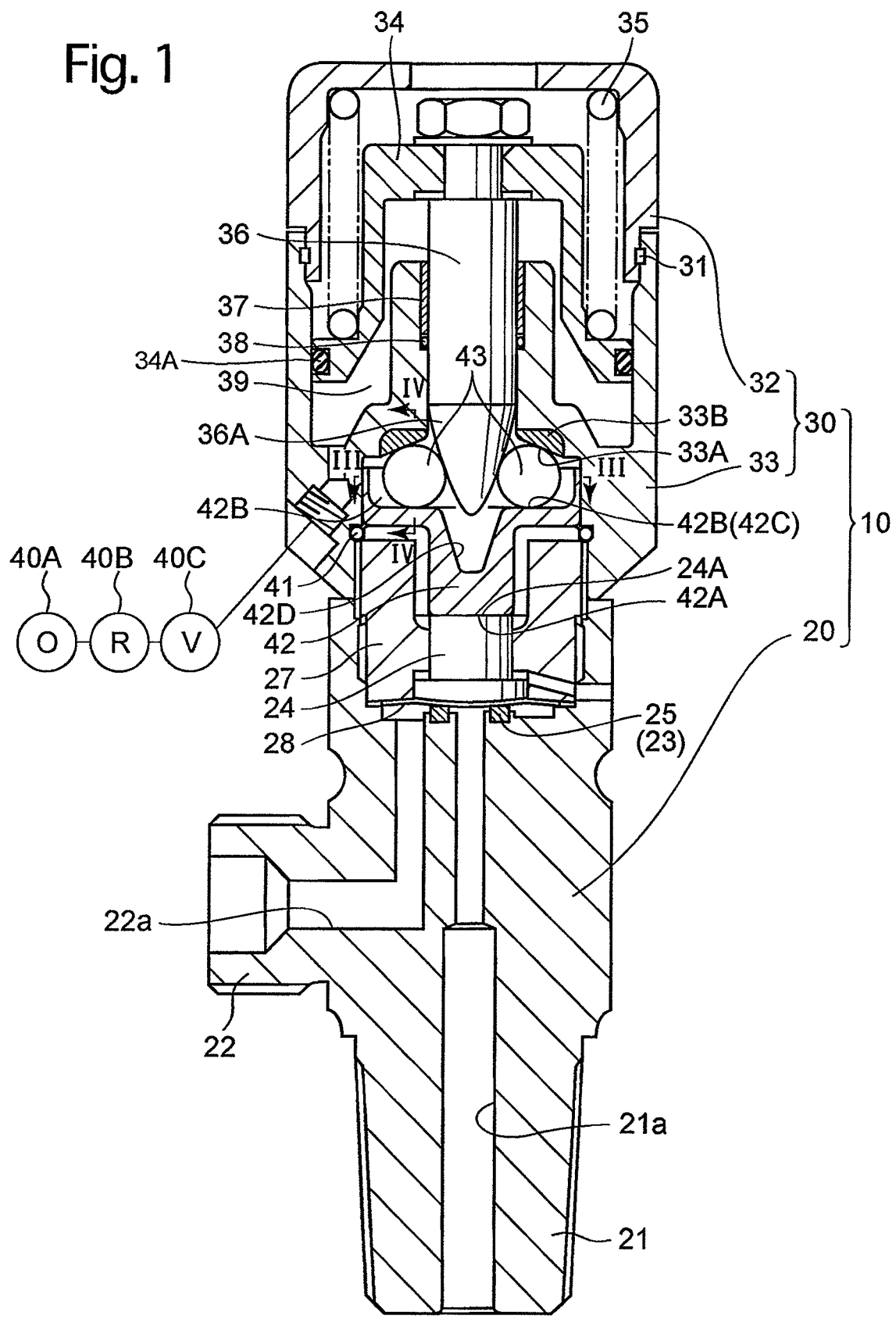
FIG. 1 is a longitudinal sectional view showing an embodiment of the power-assisted on/off valve of the present invention in a closed-valve state.

The illustrated embodiment is applied to a normally-closed type of on/off valve. As shown in FIG. 1, a on/off valve 10 is provided with a gas cylinder head 20, which is detachably attached to a high-pressure tank (gas cylinder, and a housing (cylinder) 30.

A screw-in connecting projection 21, which screws into the high-pressure tank, and a threaded-tap projection 22 are provided in the gas cylinder head 20. An annular valve seat 23 is formed in the gas cylinder head 20 so that the annular valve seat 23 is positioned on a passageway portion between a flow passage 21a of the screw-in connecting projection 21 and a flow passage 22a of the threaded-tap projection 22; the annular valve seat 23 is centered at the central axis of the flow passage 21a. An annular valve seat 25 that is made of a softer material than that of the annular valve seat 23 and has a high sealing capability is fixedly embedded into the annular valve seat 23. The valve seat 25 can be formed from, e.g., PCTFE.

A retainer 27 is fixedly screw-engaged into the gas cylinder head 20 along a common axis with that of the flow passage 21a and so as to interpose a metal diaphragm 28. A on/off valve body 24, which approaches/retreats from the annular valve seat 23 (valve seat 25) with the metal diaphragm 28 interposed therebetween, is fitted into the retainer 27 in a retained state so as to slidably move therein. The metal diaphragm 28 enables the on/off valve body 24 to move while shutting out (closing the valve) the passageways of the flow passage 21a and the flow passage 22a when the on/off valve body 24 presses against the annular valve seat 23 (valve seat 25). The upper end (the opposite end portion to that of the annular valve seat 23) of FIG. 1 of the on/off valve body 24 constitutes an external-force input end 24A.

The housing 30 includes an upper housing (upper cylinder) 32 and a lower housing (lower cylinder) 33 that are connected with each other via a lock-ring 31. The lower housing 33 is fixedly screw-engaged with the retainer 27. The lower housing 33 (housing 30) is detachably mounted onto the retainer 27 (gas cylinder head 20).

A piston body (operational member) 34 is slidably fitted into the housing 30 (lower housing 33) in an air-tight manner via an O-ring 34A. The piston body 34 is biased to move toward the on/off valve body 24 by a compression spring 35 that is inserted in between the piston body 34 and the upper housing 32. A transmission rod 36 is fixed to the piston body 34 on an axis thereof, and the transmission rod 36 is slidably supported by the housing 30 (lower housing 33) in an air-tight manner via a slip bearing 37 and an O-ring 38. A compression chamber 39 is defined between the piston body 34 and the lower housing 33. Compressed air, having a desired pressure, is supplied into the compression chamber 39 via a compressed air source 40A, a regulator 40B, and a switching valve 40C.

A pressing member 42 that is retained by a retainer ring 41 is slidably fitted into the housing 30 (lower housing 33) in the lower end shown in FIG. 1. The lower end of the pressing member 42 constitutes an output end 42A that abuts against the external-force input end 24A of the on/off valve body 24.

A reduced-diameter portion 36A, which has a reduced diameter in a direction toward the on/off valve body 24, is formed at the lower end (the end toward the pressing member 42) of the transmission rod 36. A motion-transmission surface 42B and a motion-transmission surface 33A that are spaced from each other are formed on the pressing member 42 and the lower housing 33, respectively, so as to surround the reduced-diameter portion 36A. The motion-transmission surface 33A that is provided in the lower housing 33 is fixed, and the motion-transmission surface 42B that is provided on the pressing member 42 is movable.

The reduced-diameter portion 36A of the transmission rod 36, in the illustrated embodiment, is formed as part of a spherical surface (or aspherical surface). The movable motion-transmission surface 42B is a surface that is orthogonal to the axis of the pressing member 42 (the transmission rod 36). The fixed motion-transmission surface 33A is formed as a part of a conical surface, having the same central axis as that of the pressing member 42, that increasingly narrows the space between itself and the motion-transmission surface 42B in a direction toward the outer periphery thereof. The motion-transmission surface 42B, as shown in FIGS. 3 and 4, is formed as a base surface of three radial grooves 42C that are formed in the pressing member 42 at equi-angular intervals. Each radial groove 42C has a steel ball (radial-direction movable body) 43 rotatably fitted therein. The radial grooves 42C can use an arbitrary shape such as a V-section groove 42C(V) (FIG. 4(A)) or a circular-section groove 42C (R) (FIG. 4(B)), etc. The steel balls 43 simultaneously contact each of the reduced-diameter portion 36A of the transmission rod 36, and the pair of motion-transmission surfaces 33A and 42B. Furthermore, the motion-transmission surface 33A is formed on a highly abrasion resistant hard ring body 33B that is formed as a separate member from the lower housing 33; this hard ring body 33B is fixed to the lower housing 33. The transmission rod 36, the pressing member 42 and the hard ring body 33B are formed from, e.g., quenchable SUJ2 and SUS440C, etc. A relief recess 42D, into which the reduced-diameter portion 36A of the transmission rod 36 advances and retreats, is formed in the shaft portion of the pressing member 42.

Figure 2:
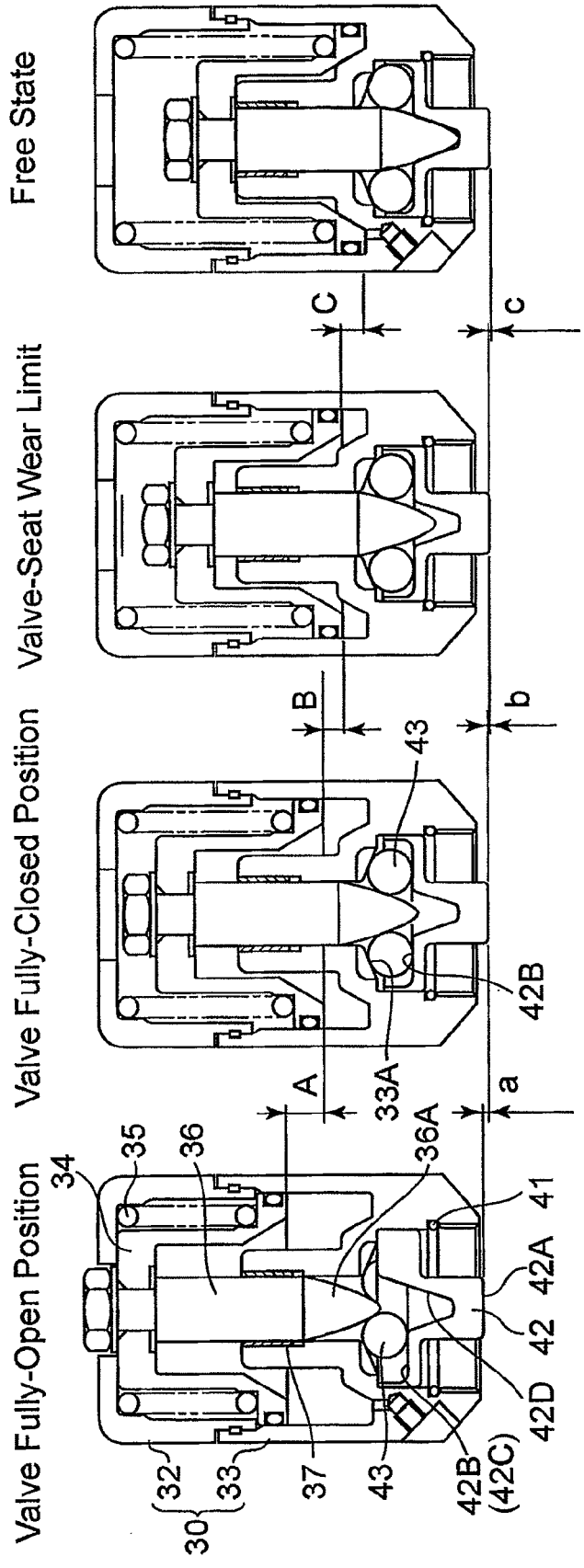
FIG. 2 shows cross sectional views of only the upper portion of FIG. 1, showing different valve-opening (valve-closing) states of the power-assisted on/off valve.

The on/off valve having the above-described structure is operated in the following manner. The drawing on the right end of FIG. 2 shows a state in which the housing 30 is removed from the gas cylinder head 20, and the piston body 34 is positioned at the downward extremity by the force of the compression spring 35. When the piston body 34 is at the downward extremity, the reduced-diameter portion 36A of the transmission rod 36 pushes the steel balls 43 in radial outward directions, and since the space between the motion-transmission surface 33A and the motion-transmission surface 42B increasingly narrows toward the outer peripheral direction, the pressing member 42 is pushed downwardly by the steel balls 43 and likewise is positioned at the downward extremity thereof.

Upon screw-mounting the housing 30 (lower housing 33) onto the retainer 27 of the gas cylinder head 20, the output end 42A of the pressing member 42 pushes the on/off valve body 24 downward via the external-force input end 24A by the force of the compression spring 35. Subsequently, the metal diaphragm 28 is seated onto the annular valve seat 23 (valve seat 25) and closes the passageway between the flow passage 21a and the flow passage 22a (closes the gas cylinder). FIG. 1 shows this closed-valve state. Note that out of the two drawings in the center of FIG. 2, the left drawing shows a close-state with a new valve seat 25 and the right drawing shows a close-state with a valve seat 25 that has reached its wearing limit. The wearing limit (a limit amount at which a closed state can be maintained upon the valve seat 25 being worn) is set to an appropriate amount.

Figure 5:
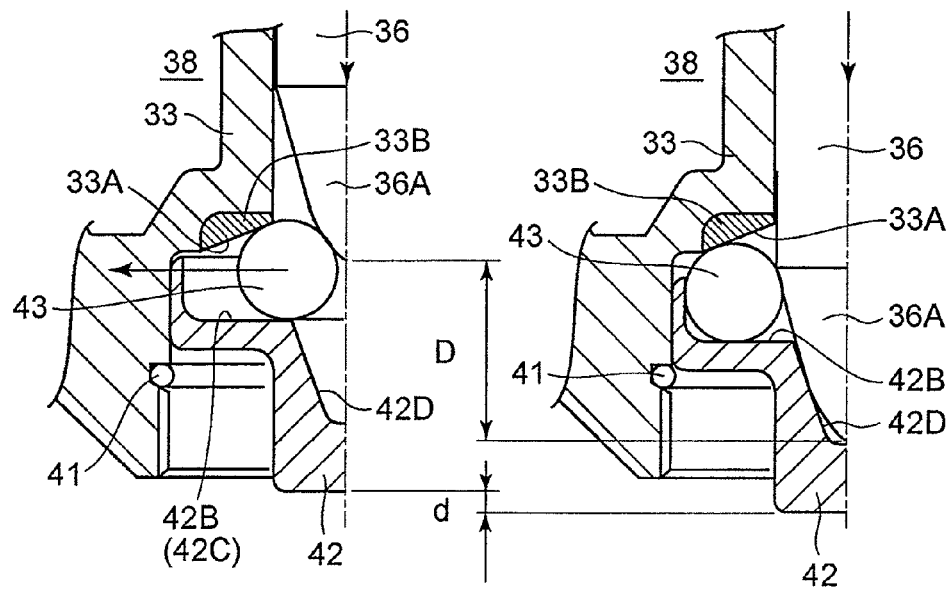
FIG. 5 shows enlarged cross sectional views showing details of a section including the motion-transmission surface of the housing, the motion-transmission surface of the pressing member, the reduced-diameter portion of the transmission rod, and a radial-direction movable body (steel ball), of the power-assisted on/off valve of FIGS. 1 and 2.

In the present embodiment, the valve-closing force via the compression spring 35 can be power-assisted and transferred to the pressing member 42 (on/off valve body 24). In other words, as shown in FIG. 5, due to the operation of the reduced-diameter portion 36A, the motion-transmission surface 33A, and the motion-transmission surface 42B, since the pressing member 42 can be moved by a movement amount d which is smaller than a movement amount D of the transmission rod 36 (D>d), the valve seat 25 of the on/off valve body 24 can press against and close the annular valve seat 23 with a strong force. The power-assistance ratio D/d can be freely set in accordance with the angle between the motion-transmission surface 33A and the motion-transmission surface 42B, and the angle of the reduced-diameter portion 36A. Specifically, this power-assistance ratio D/d value can be set to approximately 2 through 50. In an example shown in the drawings, the D/d value changes at each stroke position and is set to 6 through 11. It is adequate for the space between the motion-transmission surface 33A and the motion-transmission surface 42B to smoothly decrease toward the outer periphery, so that, e.g., unlike in the examples shown in the drawing, the motion-transmission surface 33A can be a surface that is orthogonal to the axis and the motion-transmission surface 42B can be a conical surface, or both of the motion-transmission surface 33A and the motion-transmission surface 42B can be provided as conical surfaces.

In FIG. 2, 'A' designates the amount of movement of the piston body 36 from the valve fully-closed state (the drawing on the far left of FIG. 2) to the valve-closed position (the drawing second from the left of FIG. 2), 'B' designates the amount of movement thereof from the valve fully-closed state to the valve-seat wear limit (second drawing from the right in FIG. 2), and 'C' designates the amount of movement from the valve-seat wear limit to the free state (the drawing on the far right of FIG. 2); wherein the movement amounts of the pressing member 42 at each of these sections are designated by 'a', 'b' and 'c'; and A>a, B>b and C>c.

Figure 6:
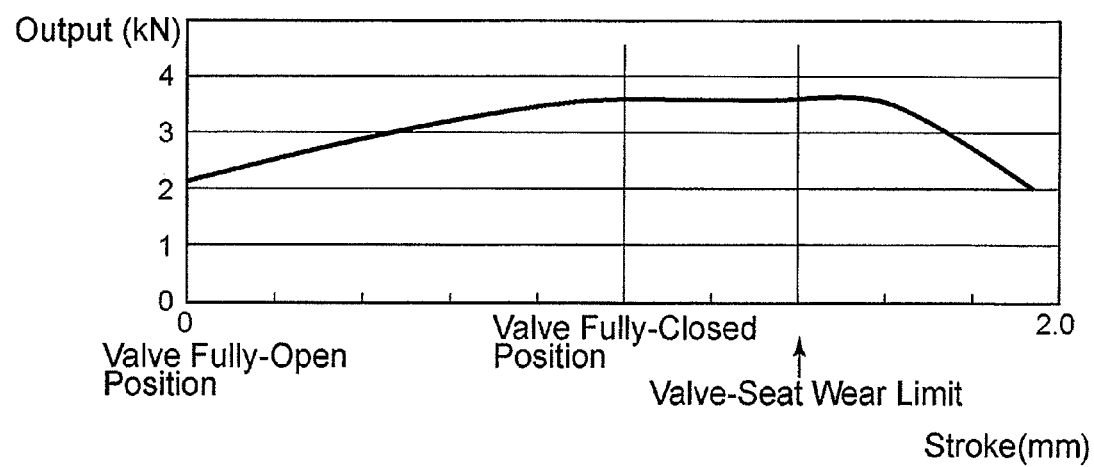
FIG. 6 is a graph showing a desirable example of the relationship between the stroke of the operational member (piston body) of the power-assisted on/off valve and the output thereof, according to the present invention.

FIG. 6 is a graph showing an example of the stroke (mm) and output (kN) of the pressing member 42 (on/off valve body 24). In this example, by forming the reduced-diameter portion 36A of the transmission rod 36 as part of a spherical surface (or aspherical surface), a substantially constant valve-closing force can be achieved from the valve fully-closed state to the valve-seat wear limit.

More specifically, the shape of the reduced-diameter portion 36A of the transmission rod 36, the spring reaction force Fs at this position, the movement amount Sp of the transmission rod 36, and the output Fo of the pressing member 42 determine the movement amount So of the pressing member 42 based on the following expression:

$$Fs \times Sp = Fo \times So$$

Namely, when the piston body 34 (transmission rod 36) is moved downward from the uppermost position by a unit amount at a time, the spring reaction force is obtained at each position thereof. Furthermore, if a desired output is determined, since the amount of movement of the pressing member 42 can be obtained from the above expression, the amount of movement of the steel balls 43 in the radial direction thereof is obtained from the angle between the motion-transmission surface 33A and the motion-transmission surface 42B, and the shape of the reduced-diameter portion 36A is obtained by connection tangent lines of each steel ball 43. Note that the reduced-diameter portion 36A of the transmission rod 36 can attain a sufficient power-assisted operation even with a simple conical surface.

In order to open the valve, regulated compressed air only needs to be fed to the compression chamber 39 via the compressed air source 40A, the regulator 40B and the switching valve 40C. When the force caused by the compressed air pressure exceeds the force of the compression spring 35, since the piston body 34 and the transmission rod 36 moves upward, and the valve-closing force dissipates, the on/off valve body 24 moves in the valve-opening direction by the pressure of the high-pressure gas in the gas cylinder, and the on/off valve body 24 (metal diaphragm 28) moves away from the annular valve seat 23 (valve seat 25). As a result, the valve is opened, the compressed gas inside the gas cylinder can be drawn from the flow passage 21a to the flow passage 22a (an apparatus, which uses the high-pressure gas, that is screw-engaged onto the threaded-tap projection 22).

INDUSTRIAL APPLICABILITY

The power-assisted on/off valve of the present invention can be widely used, e.g., as a on/off valve of a high-pressure tank (gas cylinder).

REFERENCE SIGNS LIST

10 On/off valve
20 Gas cylinder head
21 Screw-in projection
22 Threaded-tap projection
21a, 22a Flow passage
23 Annular valve seat
24 On/off valve body
24A External-force input end
25 Valve seat
27 Retainer
28 Metal diaphragm
30 Housing
32 Upper housing
33 Lower housing
33A Motion-transmission surface
33B Hard ring body
34 Piston body (operational member)
34A O-ring
35 Compression spring
36 Transmission rod
36A Reduced-diameter portion
37 Slip bearing
38 O-ring
39 Compression chamber
40A Compressed air source
40B Regulator
40C Switching valve
41 Retainer ring
42 Pressing member
42A Output end
42B Motion-transmission surface
42C Radial groove
43 Steel ball (radial-direction movable body)

The invention claimed is:
1. A power-assisted on/off valve comprising:
a valve stem which opens and closes a flow passage;
an operational member which is positioned on an axis of said valve stem and is relatively movable with respect to said valve stem; and
a power-assisted mechanism which is interposed between said valve stem and said operational member, reduces the speed and power-assists the movement of said opera- tional member, and transfers said movement of said operational member to said stem valve, wherein said power-assisted mechanism comprises:

a transmission rod which is positioned on an axis of said operational member, said transmission rod provided with a reduced-diameter portion that reduces the diameter thereof in a direction toward said valve stem;

a pressing member which is interconnected with said valve stem;

a pair of mutually opposed motion-transmission surfaces that are formed on the pressing member and on a housing that movably supports said pressing member, wherein a space between said pair of motion-transmission surfaces increasingly narrows toward the outer periphery thereof; and a plurality of radial-direction movable bodies that are interposed between said pair of motion-transmission surfaces and the reduced-diameter portion of the transmission rod and are in contact therewith, wherein said valve stem includes an on/off valve body that approaches and retreats from an annular valve seat to close and open the flow passage;

wherein said reduced-diameter portion of said transmission rod is formed so that a substantially constant valve-closing force can be achieved from a valve fully-closed state, at which the flow passage is closed by said on/off valve body seating onto the valve seat, to a valve-seat wear limit, at which a closed-valve state can be maintained even in a case where said valve seat has worn;

wherein said pair of mutually opposed motion-transmission surfaces, the reduced-diameter portion of the transmission rod, and the plurality of radial-direction movable bodies are determined so as to satisfy: $2<D/d<50$ (wherein D designates an amount of movement of the operational member in the axial direction thereof; and d designates an amount of movement of the valve stem in the axial direction thereof); and the shape of the reduced-diameter portion of the transmission rod is determined so as to satisfy: $Fs \times Sp = Fo \times So$ (wherein Fs designates a spring reaction force applied to said transmission rod; Sp designates a movement amount of said transmission rod; Fo designates a substantially constant output of said pressing member; and So designates a movement amount of said pressing member, for each stroke position of the transmission rod between a valve fully-closed state and a valve-seat wear limit).

2. The power-assisted on/off valve according to claim 1, wherein said operational member comprises a piston body that is slidably fitted in said housing, wherein said piston body moves in a valve-closing direction by a spring pressure force so as to closely approach the valve stem, and said piston body moves in a valve-opening direction by air pressure so as to move away from the stem valve.

3. The power-assisted on/off valve according to claim 1, wherein the motion-transmission surface on said pressing member comprises a surface that is orthogonal to the axis of the pressing member, wherein the motion-transmission surface on said housing is a conical surface.

4. The power-assisted on/off valve according to claim 3, wherein the motion-transmission surface on said pressing member comprises base surfaces of three radial grooves that are formed in radial directions in said pressing member, wherein said radial-direction movable bodies are fitted in the radial grooves.

5. The power-assisted on/off valve according to claim 3, wherein said motion-transmission surface on said housing comprises a hard ring body that is a separate member from said housing.

6. The power-assisted on/off valve according to claim 1, wherein said radial-direction movable bodies are steel balls.

* * * * *